Patented Nov. 29, 1938

2,138,062

UNITED STATES PATENT OFFICE 2,138,062

PREPARATION OR TREATMENT OF CEREAL FLOUR

Harry Hewitt, Manchester, England, assignor to Standard Brands Incorporated, New York, N. Y., a corporation of Delaware No Drawing. Application February 10, 1938, Serial No. 189,781. In Great Britain January 7, 1930

7 Claims. (Cl. 99—232)

The invention relates to a process for the preparation of an enzymic material adapted to effect the bleaching of cereal flour, to a process for the treatment of cereal flour therewith, to the product obtained by such treatment, and to a bread manufactured from a flour with which the bleaching agent has been incorporated.

More particularly it relates to a bleaching agent for decolorizing the carotin in flour, and especially such as may be obtained from vegetable material, as the legumes and specifically the soy bean.

In the specifications forming part of my copending applications for Letters Patent Serial Nos. 480,273 and 480,274, I have referred to the use of an auto-oxidizable substance in the treatment of cereal flour or dough, and have given soy bean flour, haricot bean flour, pea flour and lentil flour as examples of such substances.

When the bean, pea or lentil flour is added to the ingredients of a dough batch it is possible to detect in the resulting bread a slight flavor of beans which is undesirable, unless such flour is used in very small amounts.

It is an object of the invention to provide a procedure whereby an efficient bleaching of the carotin coloring matter of flour may be brought about without danger of imparting to the flour or baked product an undesirable flavor.

A further object of the invention is to provide a process whereby the enzymic bleaching agent present in legumes may be obtained therefrom in the form of an extract or solution which is substantially clear and free from solid material.

A more specific object of the invention is to obtain a separation of soluble enzymic material from the insoluble substance with which it is associated in peas, beans, etc., so that the soluble enzymic material may be utilized in the manufacture of baked goods without introducing thereinto the insoluble bean material.

Other objects of the invention will in part be obvious and will in part appear hereinafter.

By research and experiment I have discovered that the substance present in bean flours and hence in the beans, which is responsible for the bleaching action on the carotin of the usual baking flours, especially wheat flour, is enzymic in nature and soluble in water.

I have further found that if the aforesaid legume flours be extracted with water the whole of the enzymic bleaching agents dissolves in the water and the insoluble residue exhibits no bleaching properties. The extraction is carried out in the usual manner by treating the appropriate bean or legume material in comminuted form with water, agitating if desired to facilitate solution of the enzymic substance and, after a suitable period of time, separating the liquid or solution from the solid material in any of the ordinary manners, as filtration, use of a centrifugal or decantation. There is thus obtained an extract or solution, substantially clear and free from solid matter and containing the enzyme or bleaching agent. As above indicated the residue of insoluble material does not have a bleaching effect on carotin.

In addition I have found that the enzymic bleaching agent is rapidly destroyed in aqueous solution at temperatures above 50° C., but if extracted at low temperatures its properties are unimpaired.

The invention comprises the production of a solution of an enzymic or auto-oxidizable bleaching agent for use as a spray upon cereal flour during milling, and through addition to a dough batch by subjecting soya beans, haricot beans, peas or lentils, or flour produced therefrom to aqueous extraction at a temperature below 50° C., and removing the inert solid residue. The invention further comprises concentrating the aqueous solution of the agent under vacuum, after separating the insoluble matter, at a temperature below 50° C.

In one convenient application of the invention the beans, peas or lentils are washed to remove dirt and are then ground up with five to ten times their weight of cold water, or the legume flour may be mixed or ground with five to ten times its weight of cold water. The aqueous mixture is subsequently filtered, preferably under pressure, and the filtrate containing the enzymic bleaching agent and free from solid material is concentrated under vacuum at a temperature lower than 50° C. It is convenient to concentrate the aqueous solution until the weight of the concentrated liquor is equal to the weight of the legume or legume flour treated.

The concentrated solution is particularly suitable for spraying on to flour during the milling process and also for incorporating in a dough batch. The extract may be used in an amount which is at least 1% based on the weight of the flour. When utilizing the extract concentrated so that its weight shall be equal to that of the legume or legume flour treated, an amount of from 1 to 3% may be incorporated, and when the extract is unconcentrated the amount may be from 5 to 15%. The preferred amounts are about 2% of the concentrated extract and about 10% of the unconcentrated. Generally speaking, it is desirable to use a concentrated extract, and when an extract of lesser concentration is utilized, the amount suitable will be inversely proportional to the concentration of the unconcentrated extract on the basis of the concentration of the extract which is equal in weight to the weight of the bean or bean material treated as a unit. It is found that the use of the solution does not interfere or deleteriously affect the natural flavor and color of the cereal flour or of baked products under treatment in the manufacture of which it was employed as would the use of the corresponding legume itself.

The flour, for example, unbleached or partly bleached, which has been treated with the extract, may enter into the production of baked goods, as bread, by admixing in the usual manner with water, yeast and other auxiliary ingredients, forming into a dough, and finally baking. When the extract is incorporated directly into the dough it may be introduced with the various ingredients, as flour, water, yeast and others, and the mass then formed into a dough and baked. The products obtained are substantially white in color, and without deleterious odor or color arising from the substances that are present in the legume, and which would be imparted were the legume itself to be used in like amount.

It will be understood that this invention relates to the preparation and utilization of a true extract or solution, i. e., the expressions "extract" and "solution" are employed in their proper scientific and technical sense. Therefore, as used in the specification and claims these expressions mean the liquid or solution containing the dissolved substance or substances separated from the undissolved material treated with a solvent, as water, hence clear and substantially free from solid matter, and not a mixture or dispersion containing a liquid and substantially all of the treated solid matter admixed therewith.

Further, the term "extraction" connotes the treatment of a material, e. g., soy bean flour, with a solvent to dissolve the enzymic substance with subsequent separation of the liquid or extract from the undissolved material. The extract is the solution containing the dissolved substance and is separated from and does not contain the insoluble matter. The object of the extraction is to effect a separation of the soluble from the insoluble, and if insoluble material remains the principal object of the procedure would not be attained. While the extract is clear and free from solid material it may have a slight opalescence due to traces of emulsified fatty matter. Such traces of fatty matter, however, do not detract from its use as an agent for the bleaching of carotin in flours.

This application is a continuation in part of my copending application Serial No. 1,315, filed January 11, 1935, which application is a continuation in part of my original application Serial No. 497,083, filed November 20, 1930.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the treatment of cereal flour with a bleaching agent, which comprises extracting a vegetable material belonging to the group consisting of soya beans, haricot beans, peas and lentils with water in the ratio of about 1 part of bean material to about 5 to 10 parts of water, obtaining thereby an extract substantially clear and free from solid material, and incorporating the extract so obtained with flour in an amount ranging from about 5 to about 15% of the weight of the flour, said percentage varying directly in accordance with the quantity of water utilized in preparing the extract.

2. A process for the treatment of cereal flour with a bleaching agent, which comprises extracting a vegetable material belonging to the group consisting of soy beans, haricot beans, peas and lentils with water in the ratio of about 1 part of bean material to about 5 to 10 parts of water at a temperature below 50° C., obtaining thereby an extract substantially clear and free from solid material, and incorporating the extract thus obtained with flour in an amount ranging from about 5 to about 15% of the weight of the flour, said percentage varying directly in accordance with the quantity of water utilized in preparing the extract.

3. A process for the treatment of cereal flour with a bleaching agent, which comprises extracting a vegetable material belonging to the group consisting of soya beans, haricot beans, peas and lentils with water, obtaining thereby an extract substantially clear and free from solid material, concentrating the extract thus obtained until its weight is about that of the vegetable material exracted, and incorporating the concentrated extract with flour in an amount of at least 1% of the weight of the flour.

4. A process for the treatment of cereal flour with a bleaching agent, which comprises extracting a vegetable material belonging to the group consisting of soya beans, haricot beans, peas or lentils with water at a temperature below 50° C., obtaining thereby an extract substantially clear and free from solid material, concentrating the extract thus obtained under a vacuum at a temperature below 50° C. until its weight is about that of the vegetable material extracted, and incorporating the concentrated extract with flour by spraying in an amount of 1 to 3% of the weight of the flour.

5. A process for the treatment of cereal flour with a bleaching agent, which comprises extracting a vegetable material belonging to the group consisting of soya beans, haricot beans, peas or lentils by grinding said vegetable material with about five to ten times its weight of water at a temperature below 50° C., separating the solid from the liquid extract thereby obtaining an extract substantially clear and free from solid material, concentrating the liquid extract under vacuum at a temperature below 50° C., until its weight is about that of the vegetable material extracted and incorporating the concentrated extract with flour by spraying in an amount of at least 1% of the weight of the flour.

6. A process for the manufacture of bread, which comprises incorporating an extract obtained by treating a vegetable material belonging to the group consisting of soya beans, haricot beans, peas and lentils with water at a temperature below 50° C., the extract so obtained being substantially clear and free from solid material and concentrated until its weight is about that of the vegetable material extracted, with an unbleached or partly bleached flour in an amount of at least 1% of the weight of the flour, and admixing the flour thus obtained with yeast and other ingredients of a dough batch, and baking.

7. A process for the manufacture of bread, which comprises incorporating an extract obtained by treating a vegetable material belonging to the group consisting of soya beans, haricot beans, peas and lentils with water in the ratio of about 1 part of bean material to about 5 to 10 parts of water, the extract so obtained being substantially clear and free from solid material, with flour in an amount ranging from about 5 to about 15% of the weight of the flour, said percentage varying directly in accordance with the quantity of water utilized in preparing the extract, and admixing the flour thus obtained with yeast and other ingredients of a dough batch, and baking.

HARRY HEWITT.